US008408391B2

(12) United States Patent
Drouin

(10) Patent No.: US 8,408,391 B2
(45) Date of Patent: Apr. 2, 2013

(54) DRILL DRIVER MULTIPLE DRIVE BIT HOLDER, SCREW CAP CONTAINER TYPE

(76) Inventor: Michael Paul Drouin, Saint Louis, MO (US)

( * ) Notice: Subject to any disclaimer, the term of this patent is extended or adjusted under 35 U.S.C. 154(b) by 0 days.

(21) Appl. No.: 13/207,447

(22) Filed: Aug. 11, 2011

(65) Prior Publication Data

US 2013/0037434 A1 Feb. 14, 2013

(51) Int. Cl.
*B65D 85/20* (2006.01)
*B23B 45/00* (2006.01)

(52) U.S. Cl. ..................... 206/379; 173/171; 408/241 R

(58) Field of Classification Search .................. 206/378, 206/379; 173/46, 171; 408/16, 124, 241 R; 81/177.4, 490

See application file for complete search history.

(56) References Cited

U.S. PATENT DOCUMENTS

| | | | | |
|---|---|---|---|---|
| 2,842,260 | A * | 7/1958 | Molitor | 206/379 |
| 3,895,710 | A * | 7/1975 | Harvell | 206/379 |
| 4,508,221 | A | 4/1985 | Olson | |
| 4,535,658 | A | 8/1985 | Molinari | |
| 4,579,356 | A | 4/1986 | Welborn | |
| 4,797,040 | A | 1/1989 | Hibbard | |
| 4,930,953 | A * | 6/1990 | Fischer | 206/379 |
| 4,932,294 | A | 6/1990 | Chang | |
| 4,934,223 | A | 6/1990 | Wong | |
| 4,954,026 | A * | 9/1990 | Zurwelle | 408/241 R |
| 4,973,205 | A * | 11/1990 | Spaulding | 408/16 |
| 4,983,080 | A * | 1/1991 | Somers et al. | 408/241 R |
| 5,056,661 | A | 10/1991 | Balzano | |
| 5,121,803 | A * | 6/1992 | Hartmann et al. | 173/171 |
| 5,169,225 | A | 12/1992 | Palm | |
| 5,188,242 | A | 2/1993 | Smith | |
| 5,595,294 | A * | 1/1997 | McKenzie et al. | 206/379 |
| 5,740,706 | A | 4/1998 | Tseng | |
| 5,810,525 | A | 9/1998 | Ector | |
| 6,364,580 | B1 * | 4/2002 | Dils et al. | 408/16 |
| 6,401,253 | B2 | 6/2002 | Brunson | |
| D466,777 | S | 12/2002 | Watson | |
| 6,502,949 | B1 | 1/2003 | Horiyama | |
| 6,702,530 | B2 * | 3/2004 | Bennage et al. | 408/241 R |
| 6,729,480 | B1 | 5/2004 | Blake | |
| 6,739,226 | B2 | 5/2004 | Beauchamp | |
| 6,752,268 | B1 * | 6/2004 | Wadsworth | 206/379 |

(Continued)

FOREIGN PATENT DOCUMENTS

| | | |
|---|---|---|
| DE | 3514023 | 10/1986 |
| GB | 1544082 | 4/1979 |

(Continued)

*Primary Examiner* — Bryon Gehman

(74) *Attorney, Agent, or Firm* — Charles McCloskey

(57) ABSTRACT

A detachable multiple drive bit holder for cordless and powered drill drivers, impact drivers, and drills, all referred from here on as drill drivers. This bit holder will hold multiple accessories and connect to drill drivers. Most drill drivers, particularly cordless drill drivers, have a slot in the body of the driver to hold spare drive bits. Drill drivers typically have only one of these slots, allowing only one spare driver bit. The driver multiple drive bit holder utilizes this single slot manufactured into the body of a drill driver to hold a container that stores multiple drive bits of various sizes.

6 Claims, 6 Drawing Sheets

U.S. PATENT DOCUMENTS 6,761,095 B2 7/2004 Beauchamp
6,964,545 B1 * 11/2005 Languasco ...................... 408/16
6,979,155 B2 * 12/2005 Dils et al. ........................ 408/16
7,217,069 B2 * 5/2007 Dils et al. ...................... 408/124
7,540,334 B2 * 6/2009 Gass et al. .................... 173/171
7,591,616 B1 * 9/2009 Kerner .......................... 408/124
2002/0054491 A1 5/2002 Casas
2002/0105797 A1 8/2002 Navid
2003/0058637 A1 3/2003 Hsien
2004/0055917 A1 3/2004 Stern
2004/0139831 A1 7/2004 Nagy
2005/0249564 A1 * 11/2005 Van Bergen et al. ...... 408/241 R

FOREIGN PATENT DOCUMENTS

GB 2035067 6/1980
GB 2397513 7/2004
JP 4331080 11/1992

* cited by examiner

DRILL DRIVER MULTIPLE DRIVE BIT HOLDER, SCREW CAP CONTAINER TYPE

REFERENCES CITED [REFERENCED BY]
U.S. PATENT DOCUMENTS

| | | |
|---|---|---|
| 4,508,221 | April 1985 | Olson |
| 4,579,356 | April 1986 | Welborn |
| 4,797,040 | January 1989 | Hibbard |
| 4,932,294 | June 1990 | Chang |
| 4,934,223 | June 1990 | Wong |
| 4,954,026 | September 1990 | Zurwelle |
| 4,973,205 | November 1990 | Spaulding |
| 5,056,661 | October 1991 | Balzano |
| 5,169,225 | December 1992 | Palm |
| 5,188,242 | February 1993 | Smith |
| 5,740,706 | April 1998 | Tseng |
| 5,810,525 | September 1998 | Ector, Sr. |
| 6,364,580 | April 2002 | Dils et al. |
| 6,401,253 | June 2002 | Brunson |
| D466777 | December 2002 | Watson |
| 6,502,949 | January 2003 | Horiyama et al. |
| 6,702,530 | March 2004 | Bennage et al. |
| 6,729,480 | May 2004 | Blake |
| 6,752,268 | June 2004 | Wadsworth |
| 6,761,095 | July 2004 | Beauchamp |
| 6,964,545 | November 2005 | Languasco |
| 2002/0054491 | May 2002 | Casas |
| 2002/0105797 | August 2002 | Navid et al. |
| 2003/0058637 | March 2003 | Hsien |
| 2004/0055917 | March 2004 | Stern |
| 2004/0139831 | July 2004 | Nagy |
| 2005/0249564 | November 2005 | Van Bergen et al. |
| 7,591,616 | September 2009 | Kerner |

FOREIGN PATENT DOCUMENTS

| | | |
|---|---|---|
| 2035067 | June 1980 | GB |
| 3514023 | October 1986 | DE |
| 1544082 | April 1979 | GB |
| 2397513 | July 2004 | GB |
| 04331080 | November 1992 | JP |

PRIORITY DATE CLAIMED

Not Applicable.

FIELD OF THE INVENTION

The present invention relates generally to power and cordless tools of the drill driver type and more particularly to a drive bit holder adapted to be received in the standard spare drive bit holder of the drill driver.

BACKGROUND OF THE INVENTION

A variety of devices are available on the market for holding and storing drill driver drive bits. These devices come in a number of sizes and types that organize such drive bits in containers that attach to a drill driver. The major problem with the existing devices is that they are not necessarily compatible with all drill drivers because of the way they attach to the device, either through Velcro®, a self-adhesive pad or the type that screw into the frame of the drill driver. This method of attaching the drive bit storage could inherently pose the following issues:

1. the tool may not have enough surface area to accommodate the method of attachment,
2. the method of attachment needs additional space in the body of the drill driver to accommodate storage, and thus increases the size of the drill driver,
3. the method of attachment is in such a way that it hinders the user to properly handle the drill driver,
4. the method of attachment may cover cooling ducts on the drill driver, potentially causing the drill driver to overheat,
5. the method of attachment could encroach on moving or electrical parts, potentially causing the drill driver to fail,
6. the method of attachment could alter the manufacture's specifications, causing permanent damage to the drill driver,
7. the method of attachment could come loose and pose a potential safety hazard during use,
8. the method of attachment may not be approved by the manufacturer and could void the manufacturer's warranty.

Therefore, it is desirable to have a multiple drive bit holder that utilizes the manufacturer's drive bit slot already contained on the body of the drill driver. Such a device makes drive bits readily available in close proximity of the drill driver.

It is known to employ sources of drill drivers of various types. Representative arrangements of this type are disclosed in the following: U.S. Pat. No. 6,364,580 issued on Apr. 2, 2002, U.S. Pat. No. D466777 issued on Dec. 10, 2002, U.S. Pat. No. 6,502,949 issued on Jan. 7, 2003.

It is known to employ sources of drive bits of various types for use with cordless and powered tools. Representative arrangements of this type are disclosed in U.S. Pat. No. 4,535,658 issued on Aug. 20, 1985.

It is known to employ sources of drive bit holder slots of various types for use with cordless and powered tools. Representative arrangements of this type are disclosed in U.S. Pat. No. 6,702,530 issued on Mar. 9, 2004.

It is known to employ sources of drive bit holders of various types for use with cordless and powered tools. Representative arrangements of this type are disclosed in the following: U.S. Pat. No. 4,508,221 issued on Apr. 2, 1985, U.S. Pat. No. 4,579,356 issued on Apr. 1, 1986, U.S. Pat. No. 4,797,040 issued on Jan. 10, 1989, U.S. Pat. No. 4,932,294 issued on Jun. 12, 1990, U.S. Pat. No. 5,056,661 issued on Oct. 15, 1991, U.S. Pat. No. 5,169,225 issued on Dec. 8, 1992, U.S. Pat. No. 5,188,242 issued on Feb. 23, 1993, U.S. Pat. No. 5,740,706 issued on Apr. 21, 1998, U.S. Pat. No. 5,810,525 issued on Sep. 22, 1998, U.S. Pat. No. 6,401,253 issued on Jun. 11, 2002, U.S. Pat. No. 6,729,480 issued on May 4, 2004, U.S. Pat. No. 6,739,226 issued on May 25, 2004, U.S. Pat. No. 6,752,268 issued on Jun. 22, 2004, U.S. Pat. No. 6,761,095 issued on Jul. 13, 2004, U.S. Pat. No. 6,964,545 issued on Nov. 15, 2005, U.S. Pat. No. 7,591,616 issued on Sep. 22, 2009.

BRIEF SUMMARY OF THE INVENTION

In general the invention is implemented to improve the usability and convenience of a cordless/powered drill driver. The drill driver multiple drive bit holder, or apparatus, in particular improves the drive bit storage capability of a drill driver by allowing the user to store multiple driver bits instead of the standard single driver bit as provided by the manufacturer of the drill driver. The drill driver multiple drive bit holder utilizes this single slot to hold a container that stores multiple driver bits of various sizes. At one end of the apparatus is a machined rod shaped with a hexagonal cross-section exactly sized to the cross-section dimensions of the base of a typical drive bit. This rod can be inserted and retained in the drill driver's spare bit slot. Attached to this hexagonal cross-section will be a variety of drive bit holders.

The particular drill driver multiple drive bit holder described here is a screw cap container type. The screw cap container type will have a hollow cylindrical container with a screw cap connected to the hexagonal rod. The cylindrical container comes in different sizes and accommodates the storage of a variety of drill driver drive bits, for example slotted bits, Phillips bits, star drive bits, socket bits, and drill bits of different sizes. The entire apparatus can easily be attached and removed from the drill driver without the use of tools, simply remove or attach the apparatus to the drill driver's spare driver bit slot with a small force by hand.

BRIEF DESCRIPTION OF THE SEVERAL VIEWS OF THE DRAWING

The invention is illustrated in the accompanying drawings in which corresponding parts are identified by the same numerals in which.

Figure 1:
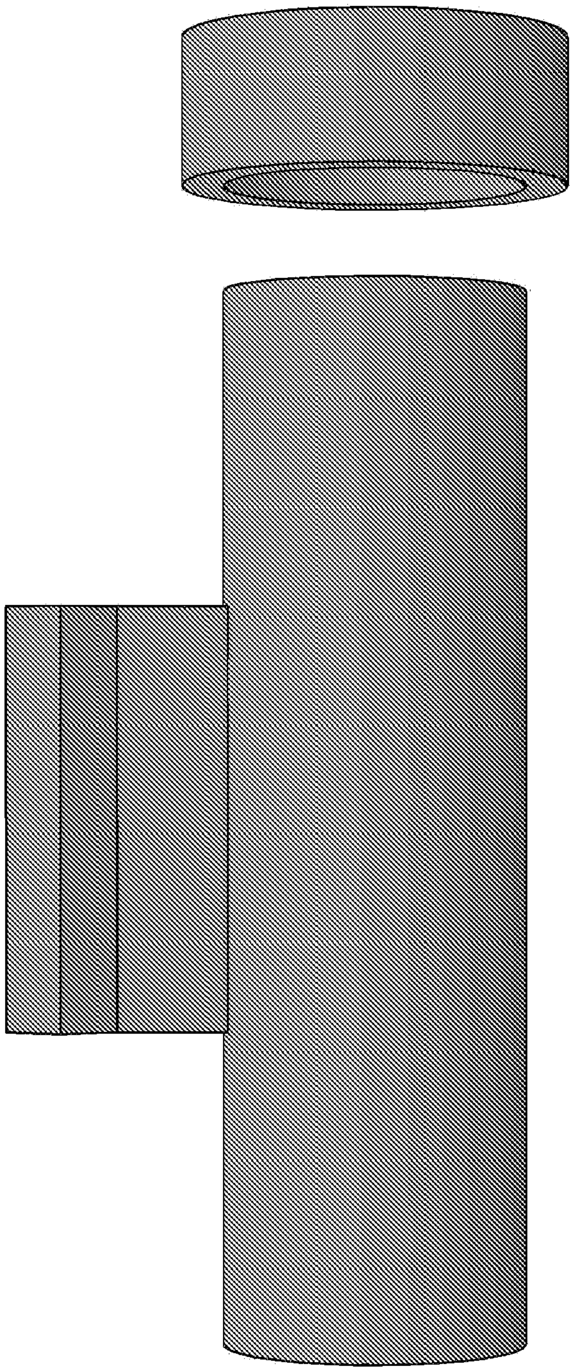
FIG. 1 is a side plan view of the invention.
Figure 2:
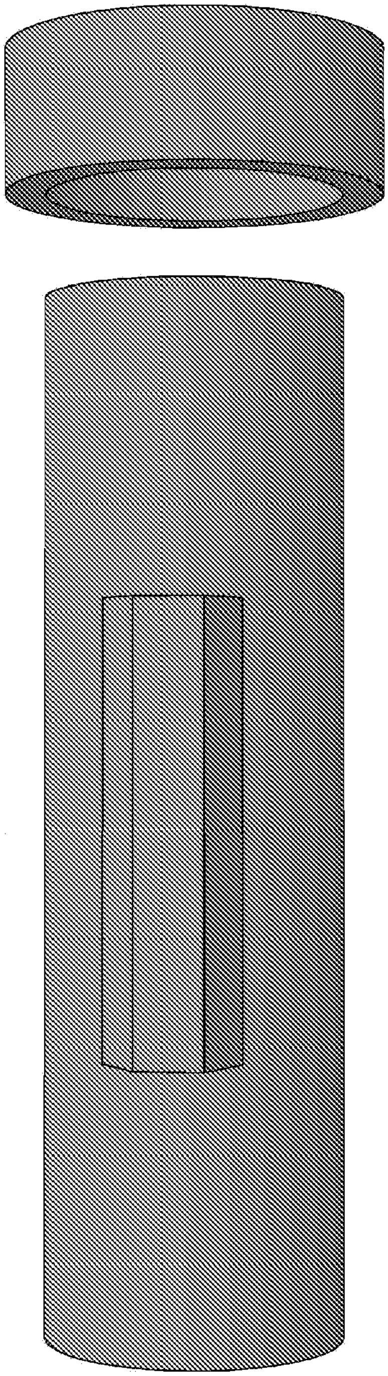
FIG. 2 is a back plan view of the invention.
Figure 3:
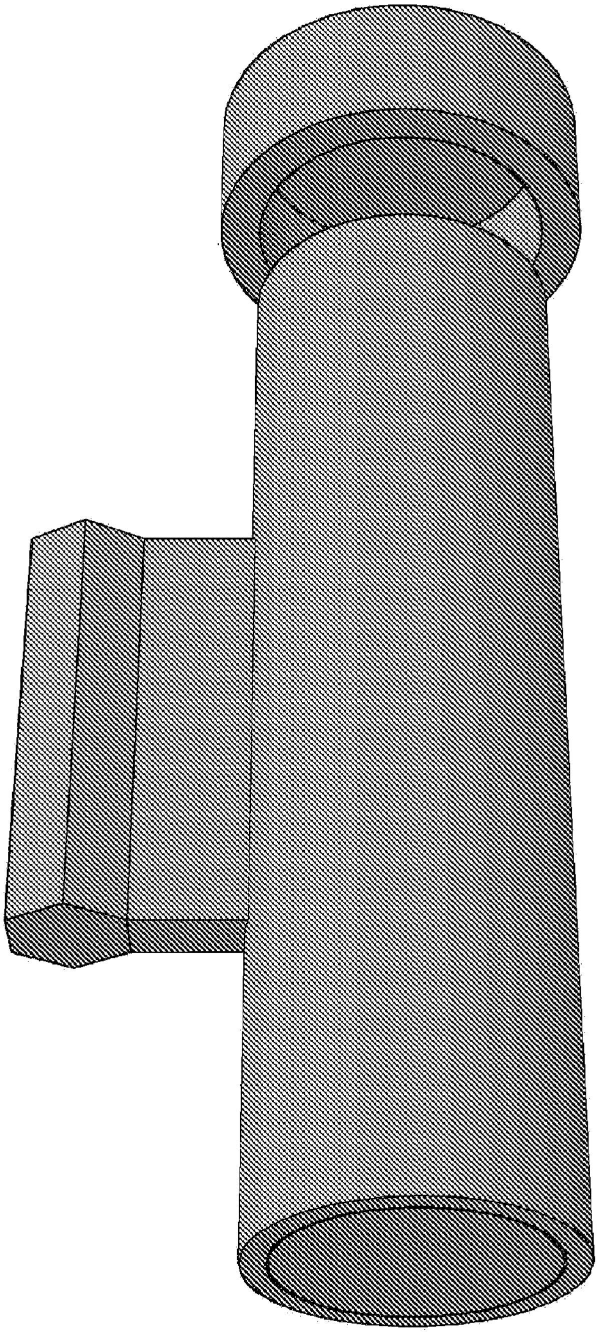
FIG. 3 is a perspective bottom view of the invention.
Figure 4:
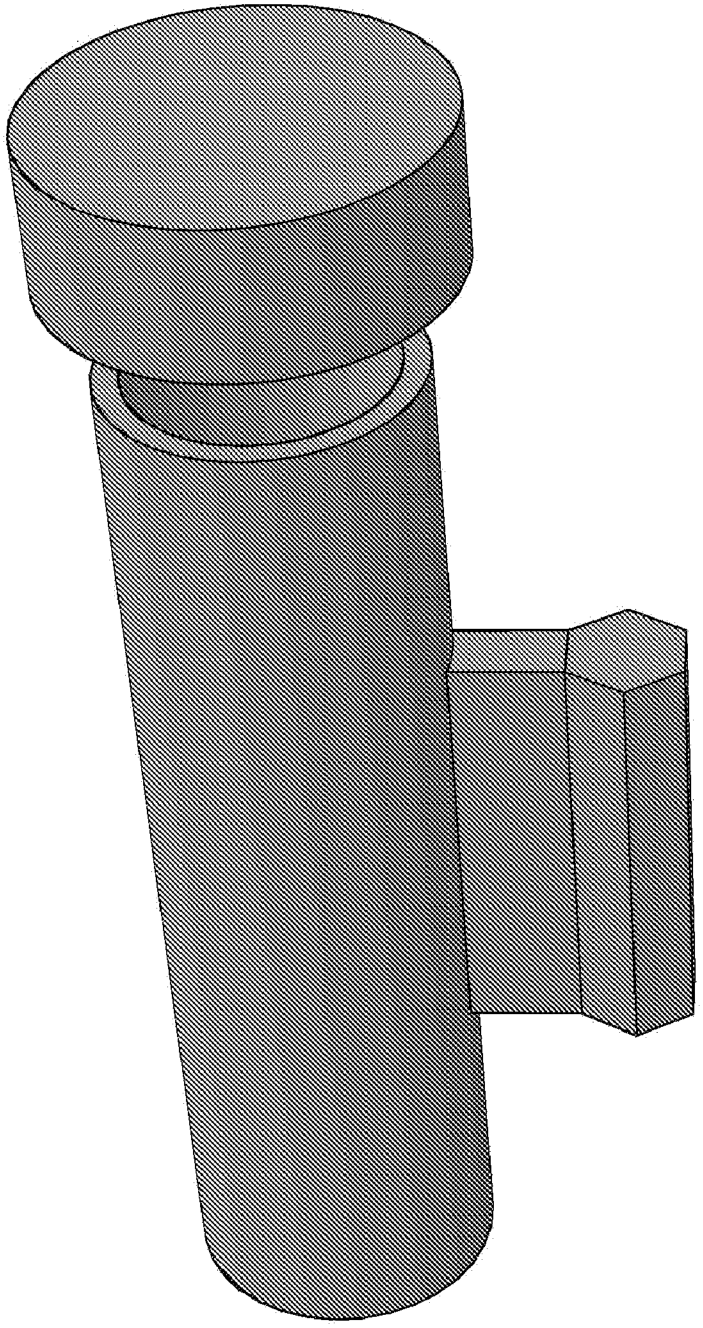
FIG. 4 is a perspective top view of the invention.

| REFERENCED ALPHANUMERICS USED IN THE DRAWINGS AND DESCRIPTION | |
|---|---|
| A | Screw Cap |
| B | Threading (actual threading not drawn) and Open End of Container |
| C | Container Body |
| D | Spacer |
| E | Base |
| F | Closed End of Container |

DETAILED DESCRIPTION OF THE INVENTION

Figure 5:
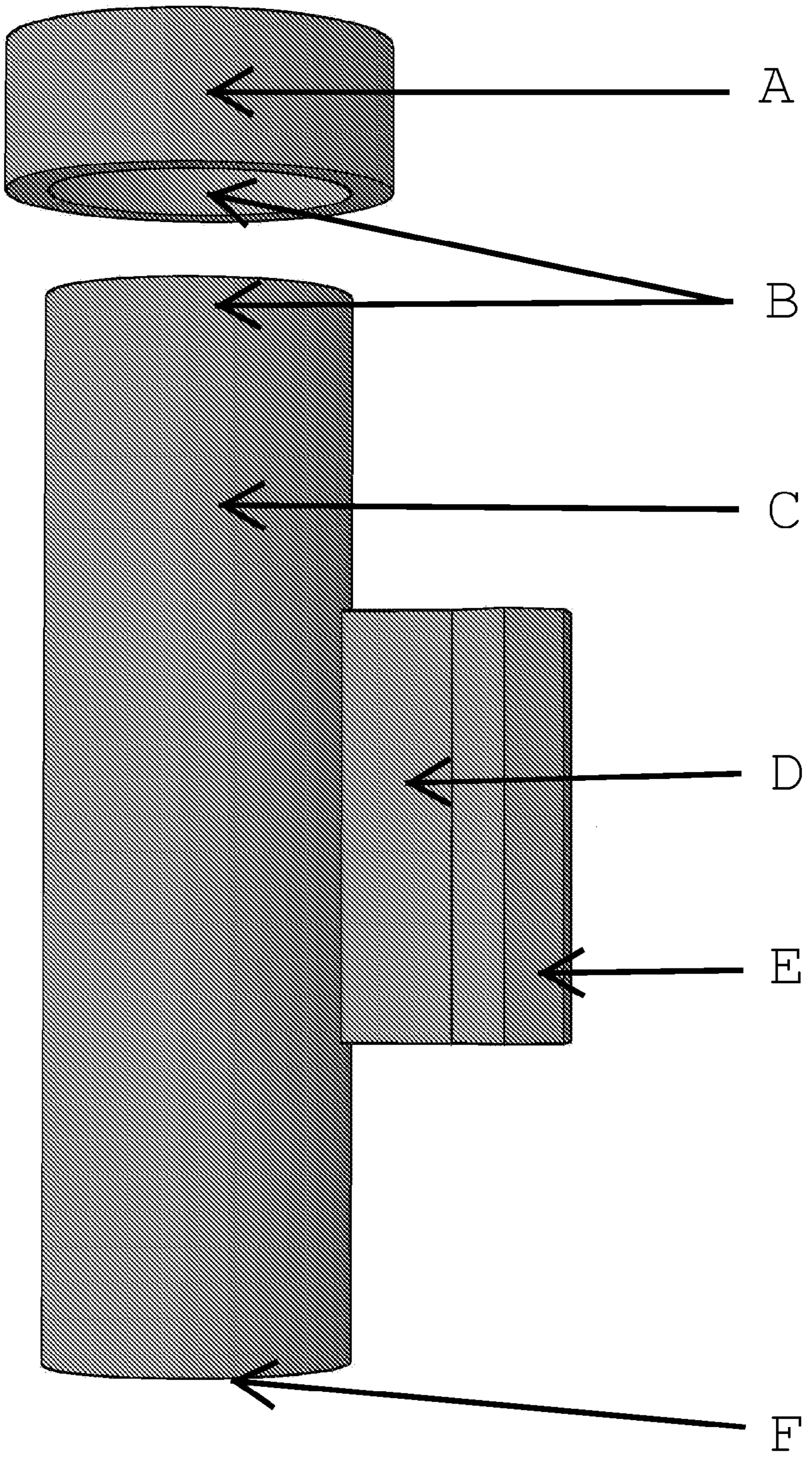
FIG. 5 is a side plan view of the invention.

The detailed description of drill driver multiple drive bit holder, screw cap container type (referred to as the invention) refers to FIG. 5 which contains a side plan view with annotations of the invention.

The invention is made of a rigid material.

The invention is comprised of a screw cap (A) that has internal threading (B) near a bottom and a container (C) which has external threading (B) near an opposite top to allow the user to attach the cap (A) to the container (C) simply by rotating it on or off.

The container (C) is hollow on the inside with an open top and solid or closed bottom (F) which is where the user would store their drill driver accessories (e.g. drive bits and drill bits of a variety of types and sizes).

Figure 6:
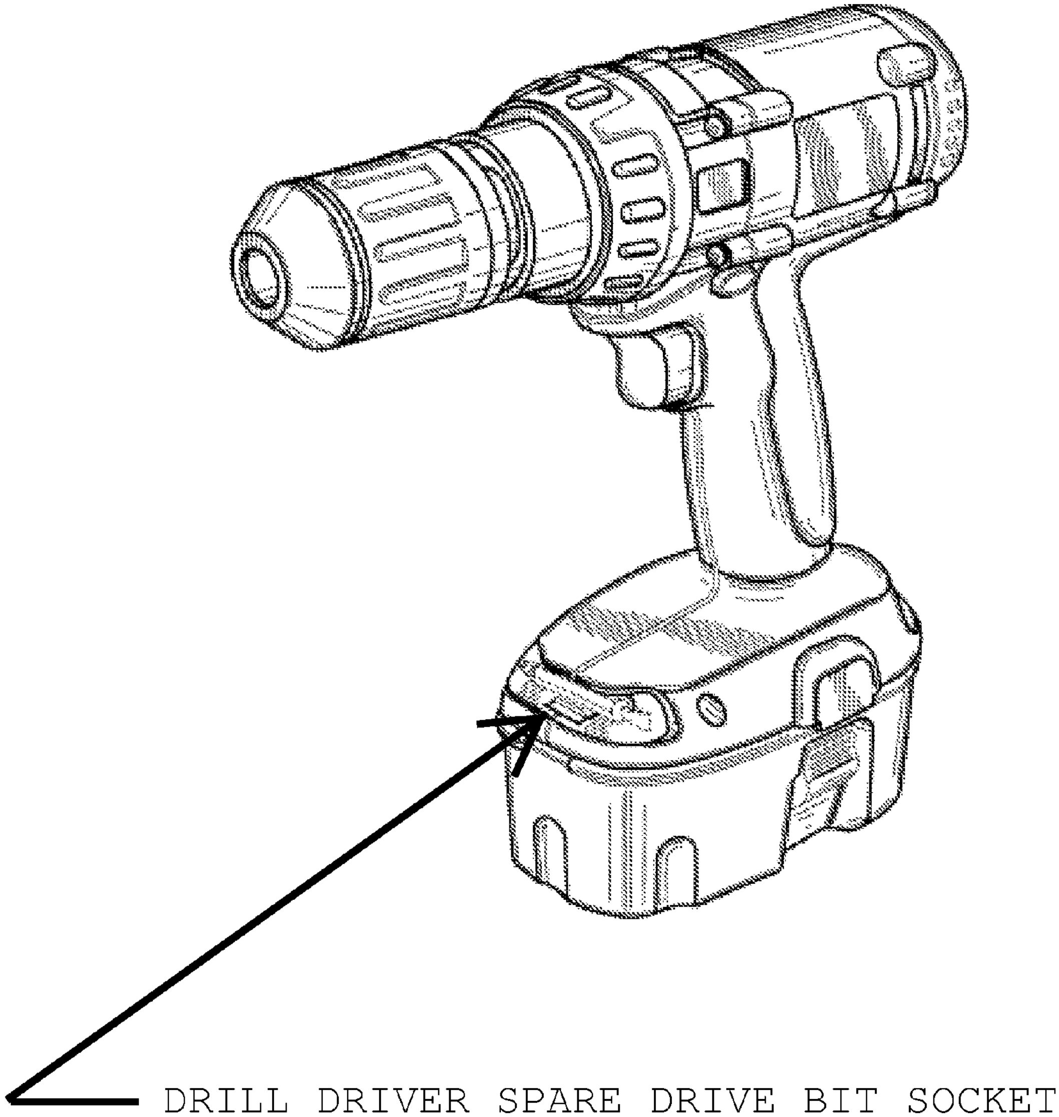
FIG. 6 Is a perspective view of a common design for a drill driver.

A hexagonal base (E) is attached to the container (C) by a spacer (D) and this hexagonal base (E) is that part which is inserted into the spare drive bit socket on the body of a drill driver as indicated in FIG. 6 by an arrow. The invention can be attached to and removed from the spare drive bit socket on the body of a drill driver by the user as often as needed.

CONCLUSION

It is apparent that variations of the invention can be constructed without departing from the main scope thereof. For example instead of a hollow container, referenced as the container type, the base of the invention could be comprised of a magnetic block upon which multiple spare drive bits for a drill driver could reside on because of their metallic/magnetic properties. Or instead of a hollow container the base of the invention could be comprised of multiple spare drive bit sockets as seen in FIG. 6 indicated by an arrow, arranged in a cylindrical pattern to hold multiple spare drive bits for a drill driver. The invention is not limited to a single type of power tool, but may be used with corded and cordless drill drivers, corded and cordless impact drivers, and with corded and cordless drills.

What is claimed is:

1. A drill driver multiple drive bit holder apparatus, comprising:

a hollow cylindrical container made of rigid material and having a bottom and an opposite open top;

a threaded screw-on cap made of rigid material; and a hexagonal rod of rigid material connected to the container, the hexagonal rod adapted to connect to a spare drive bit slot on the housing of a drill driver.

2. The apparatus according to claim 1 wherein said apparatus will remain connected in place on the drill driver by friction of said hexagonal rod.

3. The apparatus according to claim 1 wherein said hollow cylindrical container is capable of being manufactured in a variety of lengths and diameters.

4. The apparatus according to claim 3 wherein said bottom is closed.

5. The apparatus according to claim 4 further comprising: said screw-on cap engaging said open top opposite said bottom.

6. The apparatus according to claim 3 wherein said apparatus is adapted to hold multiple drive bits.

* * * * *